United States Patent [19]

Filliman

[11] Patent Number: 4,595,952
[45] Date of Patent: Jun. 17, 1986

[54] TELETEXT DECODER HAVING A REGISTER ARRAY FOR OPERATING ON PIXEL WORDS

[75] Inventor: Paul D. Filliman, Indianapolis, Ind.

[73] Assignee: RCA Corporation, Princeton, N.J.

[21] Appl. No.: 556,352

[22] Filed: Nov. 29, 1983

[51] Int. Cl.[4] .......................... H04N 7/087; H04N 7/08
[52] U.S. Cl. .................................... 358/147; 358/142; 358/146
[58] Field of Search ............... 358/141, 142, 146, 147; 340/703, 750

[56] References Cited

FOREIGN PATENT DOCUMENTS

| | | |
|---|---|---|
| WO82/03290 | 9/1982 | PCT Int'l Appl. ................. 358/160 |
| 1234473 | 6/1971 | United Kingdom . |
| 1517751 | 7/1978 | United Kingdom . |
| 1551229 | 8/1979 | United Kingdom . |
| 2054328 | 2/1981 | United Kingdom . |
| 1594766 | 8/1981 | United Kingdom . |

OTHER PUBLICATIONS

"Wireless World Teletext Decoder" by J. F. Daniels, Wireless World, Dec. 1975.
Article by P. Frandon and G. Chauvel entitled, "Antiope LSI", published in IEEE Transactions on Consumer Electronics, vol. C-25, No. 3, Jul. 1979, pp. 334-338.
Article by B. Astle entitled, "Teletext Standards in North America", published in RCA Engineer, 28-5 Sep./Oct. 1983, pp. 15-25.

Primary Examiner—Tommy P. Chin
Assistant Examiner—Michael D. Parker
Attorney, Agent, or Firm—Eugene M. Whitacre; Joseph J. Laks; Sammy S. Henig

[57] ABSTRACT

A teletext decoder extracts digital information from a video signal for displaying graphics and textual information embedded in the video signal. The decoder includes a prefix processor responding to user supplied commands for selecting and storing the pertinent embedded information into a memory. The microcomputer reads the data provided by the prefix processor, converts it to pixel words representing picture elements and restores the converted data into the memory. The decoder includes a display processor which reads more than one pixel word at a time when accessing the memory, and translates each pixel word to 3 groups of color codes and to a one-bit transparency code.

6 Claims, 3 Drawing Figures

TELETEXT DECODER HAVING A REGISTER ARRAY FOR OPERATING ON PIXEL WORDS

BACKGROUND OF THE INVENTION

This invention relates to a teletext decoder having a microcomputer for creating a pixel map, and having a register array for translating a pixel word of the pixel map to a color code and another code called a transparency code.

Teletext is a general term for a television-based communication technique. A horizontal line may be utilized for broadcasting textual and graphical information encoded in a digital binary representation. Teletext may be sent during the vertical blanking interval, when no other picture information is sent. The teletext binary information includes control and display digital information serially organized in data blocks. The organization of the binary information in the broadcasted signal is determined by the standard employed by the broadcaster. By way of an example only, references are made here to the proposed NABTS (North American Broadcast Teletext Specification).

In the NABTS each horizontal line containing teletext data is referred to as a packet. The binary data is divided into bytes; each byte includes eight binary units (bits). The first eight bytes of each packet are collectively known as the packet header. Three bytes of the packet header define the channel number and each channel is organized into pages. Each page is made up of a number of packets.

After its reception by the television receiver, the digital data included in the video signal is processed by the teletext decoder. Then the digital data is extracted from the video signal by a data slicer providing a stream of bits to a data processor (sometimes referred to as the prefix processor). The data processor may be made to receive user-initiated commands specifying the desired information for display. The data processor buffers in a memory the data contained in the teletext channel selected for displaying. The buffered data is processed and provided to a display processor which outputs the displaying signals. When a television picture tube (CRT) is used as an image displaying device, the display processor has to output the displaying signals periodically for maintaining the image on the television screen.

One feature of the invention is a microcomputer which processes the buffered teletext data words obtained from the data processor to create a pixel word map for usage by the display processor. The pixel word map includes pixel data words. Each pixel word defines the display information of one picture element called pixel. The pixel word may select a display word which characterizes a pixel. The possible number of display words which may be selected by a pixel word may equal to the binary value of the pixel word. The display processor reads the pixel data words from the pixel word map sequentially and provides the display with signals characterizing the pixels. This arrangement in which the display processor is provided with the pixel word map obviates the usage of a character generator and makes the design of the display simple.

Another feature of the invention is the bit arrangement of the display word selected by the pixel word. The display work of the invention includes a color code and a separate transparency code. The transparency code may be used to control the source of picture information provided to the red, green and blue drive circuits of the cathode ray tube. When the transparency code has a given value, the color code associated with the display word is the source of picture information. When the transparency code has a second value, a source other than that of the teletext signal provides the pixel picture information. Such other source may be one that sends a picture video signal at times when the teletext video signal is not sent.

One advantage of utilizing a transparency code which coexists with the color code is that the circuit utilized for translating the streamlined pixel word to a display word is relatively simple. Such circuit may be constructed from an array of registers addressed by a pixel word. A register selected by a pixel word may include a color code and a coexistent transparency code.

Another advantage of utilizing a display word that contains a transparency code which coexists with the color code in the same display word is that it may be possible to permit the user to override the transparency code. In such a case, the color code of the display word determines the characteristics of the pixel.

SUMMARY OF THE INVENTION

A decoder of teletext-like signals containing picture information includes a data processor for obtaining a digital message derived from the teletext-like signals. A memory stores the digital message. The microcomputer reads the stored data, processes it and restores the processed data as pixel words in a memory. A display processor reads the pixel words from the memory and generates driving signals to characterize a displayed pixel.

DETAILED DESCRIPTION OF THE INVENTION

Figure 1:
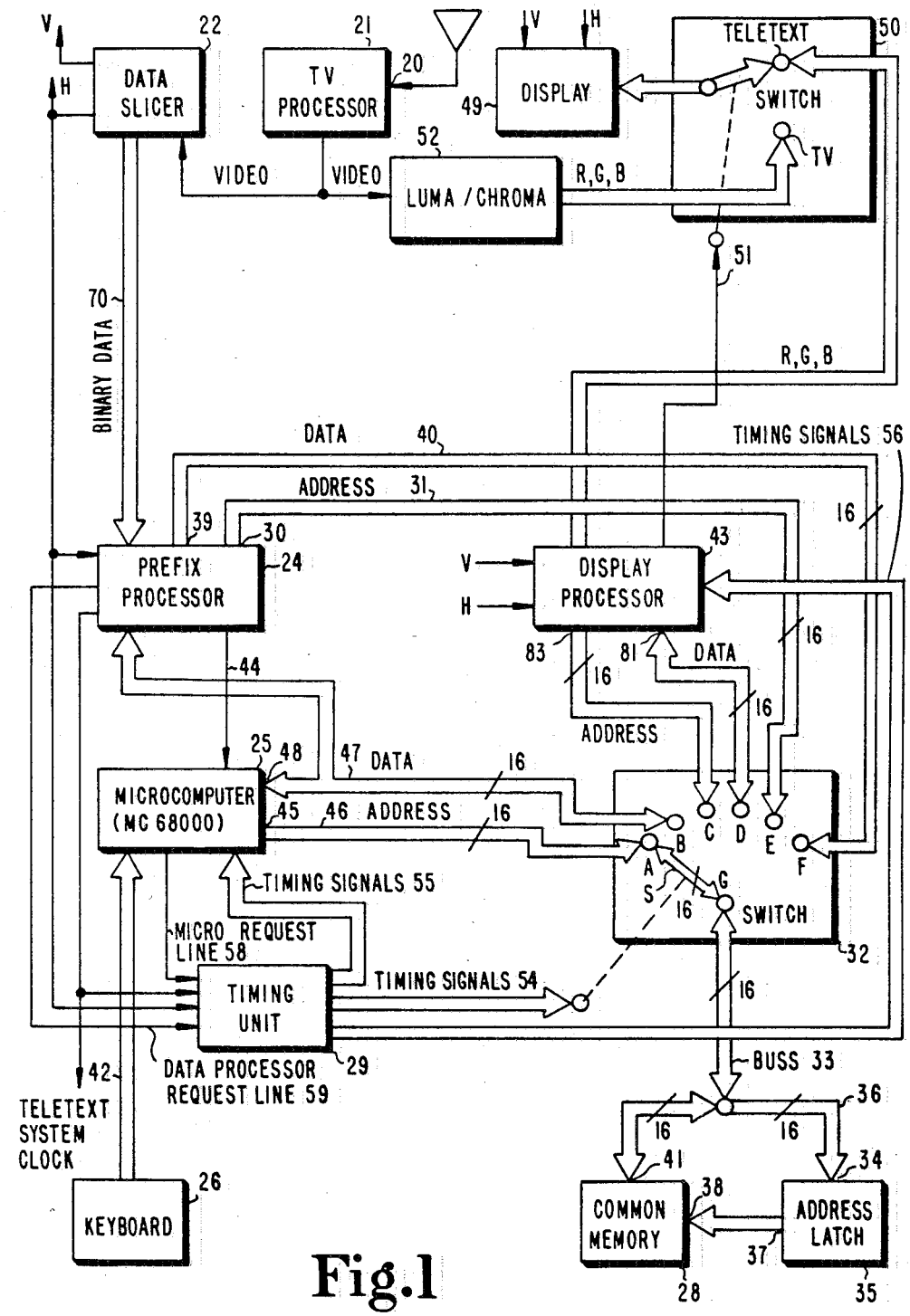
FIG. 1 illustrates a teletext decoder embodying the invention.

The teletext decoder in FIG. 1, which embodies the invention, receives a video-modulated signal at input 20 of a television processor 21. Processor 21 includes such well known television receiver stages as the tuner, the intermediate frequency amplifier and the video detector. Data slicer 22 receives the detected video from television processer 21 for detection and separation of the teletext binary data. Data slicer 22 generates horizontal and vertical sync signals along signal lines H and V respectively synchronized to the incoming composite video signal. Data slicer 22 provides a serial data stream and a reconstituted clock on lines 70 to a data processor 24 such as the conventional prefix processor of a teletext decoder. The reconstituted clock is used to synchronize the teletext system clock developed by data processor 24 and distributed to various stages within the decoder. User intitiated commands are coupled to data processor 24 by a microcomputer 25. By operating a keyboard 26, the user selects the magazine and page number to be displayed. Microcomputer 25 receives the user selected data from keyboard 26 along a signal line 42 and issues a 12 bit word to data processor 24 on select lines 27. This word signifies the required NABTS defined packet address.

After the occurrence of horizontal sync, the data processor begins searching for the presence of the NABTS-defined framing code in the serial data stream received from data slicer 22. If a valid framing code occurs, data processor 24 begins packing the serial data stream into 8 bit units called bytes. Data processor 24 processes the next 3 bytes to obtain the packet address. Microcomputer 25 provides a 12 bit word to data processor 24 on lines 44 for specifying the required packet address. When a match occurs between the required packet address and the packet address of the incoming teletext data, data processor 24 begins the transfer of all the subsequent bytes included in the NABTS-defined data packets to a plurality of memory locations at time slots controlled by a timing unit 29; in the decoder of FIG. 1 the plurality of memory locations is included in memory 28.

Memory 28 is time-shared by microcomputer 25, data processor 24 and a display processor 43. Time sharing of memory 28 is accomplished by a timing unit 29. Timing unit 29 assigns a time slot for each access to common memory 28.

Time slots to display processor 43 are provided at a predetermine rate by timing unit 29; whereas, time slots to data processor 29 and to microcomputer 25 are provided according to a priority scheme of timing unit 29 which provides data processor 24 with a higher priority over microcomputer 25. The result is that display processor 43 has the highest priority for its time slot in that it always gets access in it.

Data words are transferred to memory 28 from data processor 24 using a two-step process that is accomplished within a single time slot. A request line 59 indicates to timing unit 29 that data processor 24 is ready to perform an access to memory 28. In the first step, an address word is transferred from an address port 30 of data processor 24 on lines 31 to a port E of a switch 32. Timing unit 29 provides timing signals 54 to control switch 32 to move switch lines S to contact port E for transferring the address words to a buss 33 by way of a port G. Buss 33 may be made of 16 lines to define a 16-bit buss. From buss 33 the address word is transferred on lines 36 to an input port 34 of an address latch 35. The address word is stored in address latch 35, and an output port 37 transfers the stored address word to a memory address port 38 for selecting the location in memory 28 to which the transfer of the teletext word is directed.

In the second step, a data word is transferred on lines 40 from a port 39 of data processor 24 to a port F of switch 32. Timing unit 29 controls switch lines S of switch 32 for transferring the data to the same buss 33. Buss 33 directs the data to memory data port 41. The data word is then stored in memory 28 in the location selected by the stored address word of address latch 35.

The actual data word transfer between microcomputer 25 and memory 28 is also performed by a two-step process. A request line 58 indicates to timing unit 29 that microcomputer 25 is ready to perform an access to common memory 28. In the first step, an address word is transferred from an address port 45 of microcomputer 25 on lines 46 to a port A of switch 32. From buss 33 the address word is transferred on lines 36 to input port 34 of address latch 35. The address word is stored in address latch 35. In the second step, microcomputer 25 performs either a transfer to or a transfer from memory 28. If a transfer to memory is required, a data word is transferred on lines 47 from a data port 48 of microcomputer 25 to a port B of switch 32. On the other hand, if a transfer from memory 28 to microcomputer 25 is required, a data word is transferred from memory data port 41 to buss 33 and from there to port B of switch 32 under the control of timing unit 29. From port B of switch 32, the data word is transferred on lines 47 to microcomputer data port 48.

The operation of timing unit 29 and memory 28 is described in greater depth in copending U.S. patent application Ser. No. 556,353 by P. D. Filliman, entitled, TELETEXT DECODER USING A COMMON MEMORY, concurrently filed herewith and hereby incorporated by reference.

Data processor 24 stores each subsequent data word in a consecutive memory address. In doing so, it creates a data processor buffer 201 as illustrated in the schematic arrangement in FIG. 2 of memory 28 of FIG. 1. This data buffer may be read by microcomputer 25 for further processing as explained later on. By reading lines 49 microcomputer 25 may ascertain the number of data words transferred by data processor 24 to memory 28. Microcomputer 25 reads data processor buffer 201, located in memory 28, and transfers its contents to a different group of locations, a page storage buffer 202 of FIG. 2 in memory 28 of FIG. 1.

Page storage buffer 202 is used for storing the teletext data corresponding to the most likely pages the user may request. For example, the preceding page is likely to be requested by the user. By storing it in buffer 202, the decoder may provide quick response to a user for the preceding page because the preceding page is already stored in buffer 202 at the time the user initiates such request.

Figure 2:
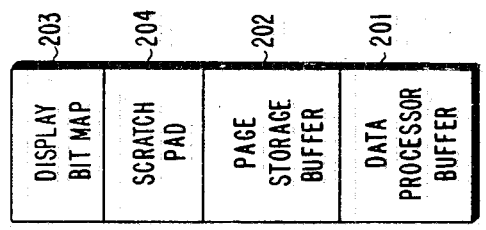
FIG. 2 illustrates an example of memory storage allocation for the memory of FIG. 1.

In accordance with one aspect of the invention, after transferring the teletext data of data processor buffer 201 to page storage buffer 202, microcomputer 25 processes page storage buffer 202 and stores the results in a plurality of memory locations; in the decoder of FIG. 1 the plurality of memory locations is included in a display bit map 203 illustrated in the schematic arrangement in FIG. 2 of memory 28 of FIG. 1. A location in display bit map 203 may contain display information organized in a simple condensed format, which permits a simplified construction of display processor 43. This advantage is achieved by directing microcomputer 25 to process the teletext data words and present it to display processor 43 in a simple format as described in more detail later on.

Because microcomputer 25 is, in effect, a general purpose microcomputer, it may perform tasks unrelated to teletext signal decoding. For example, it may be made for controlling the local keyboard. To perform these tasks, microcomputer 25 may use a scratch-pad 204 storage space of memory 28, as illustrated in FIG. 2.

The transfer of a data word from memory 28 to display processor 43 is similar to the transfer to microcomputer 25 from memory 28. In this case, as illustrated in FIG. 1, an address word is provided from an address port 83 of display processor 43 and the data word is received at a data port 81. The address word is coupled to a port C of switch 32 and the data word is coupled from a port D. Timing signals 56 from timing unit 29 provide timing signals to control operation of display processor 43. Data transfer is performed in a similar way to the two-step process employed for transferring a data word from memory 28 to microcomputer 25.

Display processor 43 reads memory 28 and provides an analog red signal, an analog green signal and an analog blue signal for display 49 of FIG. 1 in a manner to be further described. Display 49 includes, for example, a television picture tube as the displaying device.

Each displayed scan line is divided into picture elements called pixels. The picture information of each pixel is stored by microcomputer 25 in display bit map 203 of FIG. 2 of memory 28 as, illustratively, a 4-bit pixel word. A given combination of bits of a pixel word corresponds to a given display information for a pixel defined by said pixel word. Display processor 43 reads display bit map 203 sequentially.

The teletext decoder of FIG. 1 has a 16-bit-wide memory 28. Thus, since more than one pixel word can be stored in one memory address, every memory access advantageously provides display processor 43 a plurality of pixel words for sequential processing.

Figure 3:
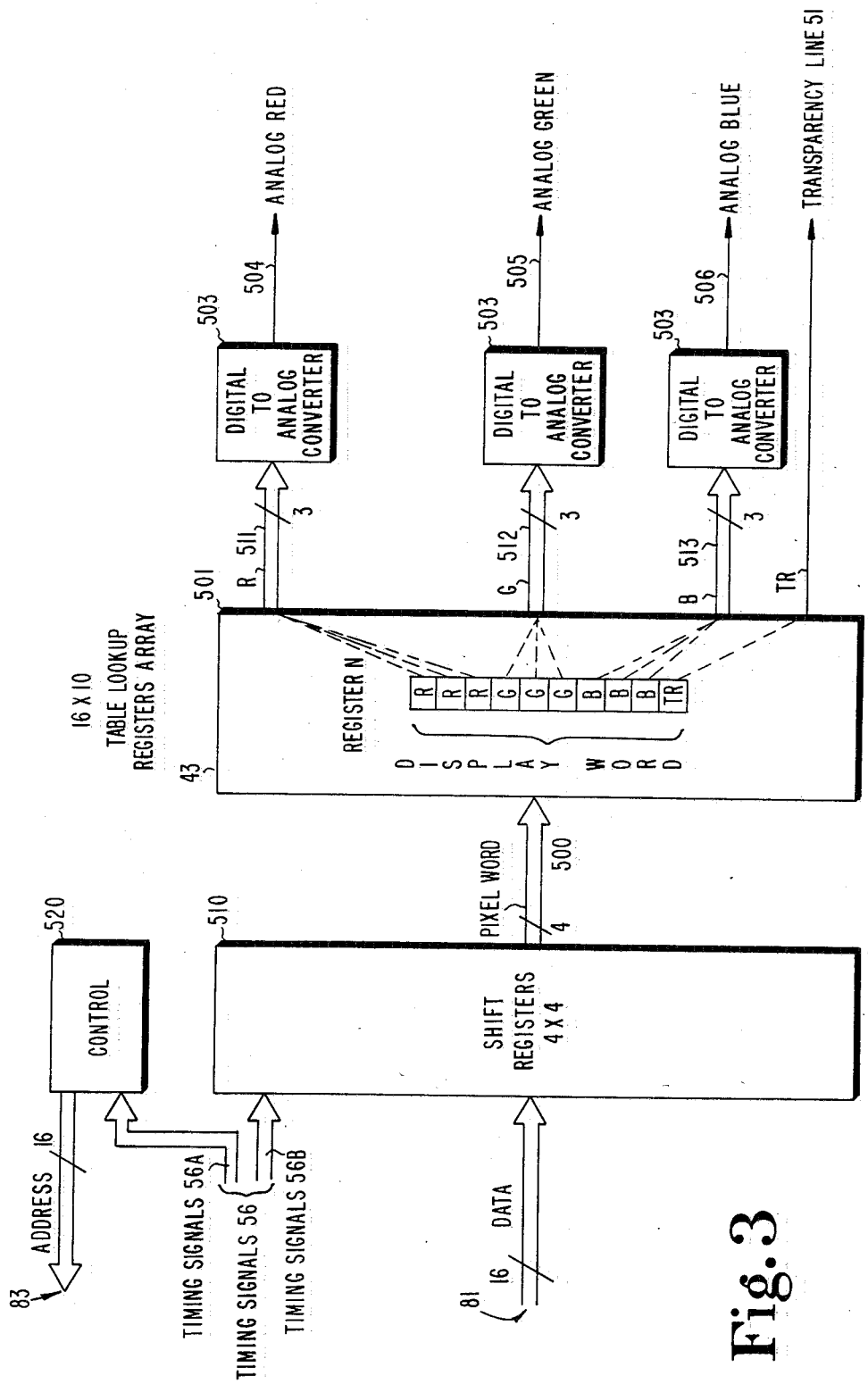
FIG. 3 illustrates an embodiment of a pixel word processing circuit in accordance with an aspect of the invention.

FIG. 3 illustrates an emobodiment of display processor 43 for the teletext decoder illustrated in FIG. 1. Items identified similarly in both figures function similarly or represent similar quantities. In FIG. 3, an address word developed at address port 83 for fetching or reading pixel words from memory 28 of FIG. 1 is provided by a control stage 520 of display processor 43 under the control of lines 56A of timing signals 56.

The sequential processing of the plurality of pixel words obtained from memory 28 in a given fetching operation is implemented by using shift registers 510 illustrated in FIG. 3. Shift registers 510, under the control of clock lines 56B of timing signals 56, disassemble each 16-bit data word obtained through port 81 to obtain four 4-bit pixel words. Each of the 4 pixel words is sent sequentially along a common buss 500 to address a table look-up array 501.

Table look-up array 501 may be implemented using a 16×10 register array, namely, an array having 16 registers each 10 bits wide, with the Nth register being illustrated in FIG. 3.

A given 4-bit pixel word defines a given one of 16 binary combinations and therefore it addresses the corresponding register of array 501. The 10 bits of each register form a display word partitioned into 3 groups of color codes R, G, B, each group being 3 bits wide, and a coexistent 1-bit transparency code, TR. A given value of a color code determines the intensity of the corresponding color.

Group R of the display word is coupled to a buss 511 for driving a digital-to-analog converter 503 to generate an analog red signal on a line 504. An analog green signal on a line 505 and an analog blue signal on a line 506 are obtained in a similar manner by coupling groups G and B to busses 512 and 513 respectively, and then to their digital-to-analog converters. The 3 analog signals are fed by way of an R, G, B bus to a port TELETEXT of a switch 50 of FIG. 1.

Switch 50 couples analog red, green and blue signals to display 49 for driving a picture tube in the display. The type of signal source, teletext video or normal video, feeding display 49 is determined by the position of switch 50. The position of switch 50 is controlled by the transparency code, TR developed on transparency line 51.

When transparency code TR is in a first logical state, switch 50 couples a port TV to display 49 so that the red, green and blue analog information from a conventional luma/chroma circuit 52 is then transferred to display 49. When transparency code TR is in the other logical state, switch 50 couples the port TELETEXT to display 49.

The arrangement of having each of the 16 display words in array 501 of FIG. 3 contain both a color code and a coexistent transparency code is a particularly advantageous one. For example, this arrangement gives transparency line 51 the capability to control the display of teletext or non-teletext information in a simple manner on a pixel-by-pixel basis. This capability may be of use, for example, in captioning.

What is claimed is:

1. A decoder for teletext-like signals containing control information and containing picture information for displaying by an imaging device, comprising:
   a data processor responsive to said teletext-like signals for developing binary data therefrom;
   a first plurality of memory locations for storing said binary data;
   a second plurality of memory locations;
   a microcomputer for controlling operation of said decoder, said microcomputer having access to said first plurality of memory locations for reading said binary data obtained from said data processor and having access to said second plurality of memory locations for storing therein pixel data words that said microprocessor derives from said binary data, wherein a given combination of bits of a pixel data word corresponds to a given display information for a pixel defined by said pixel data word; and
   a display processor having access to said second plurality of memory locations for reading said pixel data words from said second plurality of memory locations such that the picture information of the corresponding pixels is capable of being displayed in said imaging device, wherein said display processor includes an array of registers for translating the given bit combination assumed by a pixel data word to a color code and to a coexistent transparency code said codes providing display information for a pixel such that both the color and transparency codes associated with the pixel data word are contained in a corresponding register of said array of registers.

2. A decoder as recited in claim 1 further comprising a switch for selectively providing said display information for said pixel from said color code or from a signal other than said teletext-like signal, said switch selectively providing the display information according to the state of said transparency code.

3. A decoder as recited in claim 2 wherein a given register of said registers is addressed by the bit combination assumed by said pixel data word.

4. A decoder as recited in claim 3 wherein bits of said given register are partitioned into at least said color code and said transparency code that is separate from said color code.

5. A decoder for teletext-like signals containing control information and containing picture information for displaying by an imaging device, comprising:
   a data processor responsive to said teletext-like signals for developing binary data therefrom;
   means for deriving pixel data words from said binary data; and
   a display processor for providing picture information contained in the corresponding pixel data words in such a way that the picture information contained in the pixel data words is capable of being displayed in said imaging device, said display processor including an array of registers for translating a binary combination assumed by a given pixel data word of said pixel data words to a color code and to a coexistent transparency codes said codes providing display information for a pixel such that both said color and coexistent transparency codes are contained in a register of said array that corresponds with said given pixel data word.

6. A decoder as recited in claim 5 wherein said color code comprises a bit combination for determining the intensity of a corresponding color.

* * * * *